United States Patent [19]

Linnig

[11] Patent Number: 4,926,992
[45] Date of Patent: May 22, 1990

[54] ELECTROMAGNETICALLY OPERABLE FRICTION-DISK CLUTCH

[76] Inventor: Karl-Heinz Linnig, Kapitän Wagnerstrasse 34, 7990 Friedrichshafen, Fed. Rep. of Germany

[21] Appl. No.: 275,771

[22] Filed: Nov. 17, 1988

[30] Foreign Application Priority Data

Nov. 21, 1987 [DE] Fed. Rep. of Germany ....... 3739537

[51] Int. Cl.$^5$ ............................................. F16D 27/08
[52] U.S. Cl. .............................. 192/48.2; 192/84 AA; 192/84 AB; 192/84 C
[58] Field of Search .......... 192/84 AA, 84 AB, 84 C, 192/84 R, 48.2

[56] References Cited

U.S. PATENT DOCUMENTS

| | | | |
|---|---|---|---|
| 4,488,627 | 12/1984 | Streich et al. | 192/84 AB X |
| 4,498,066 | 2/1985 | Fujiwara et al. | 192/84 C X |
| 4,718,526 | 1/1988 | Koitabashi | 192/84 C X |

FOREIGN PATENT DOCUMENTS

| | | |
|---|---|---|
| 3203143 | 8/1983 | Fed. Rep. of Germany . |
| 3443523 | 6/1986 | Fed. Rep. of Germany . |
| 226721 | 12/1984 | Japan ................. 192/84 C |

Primary Examiner—Randolph A. Reese
Assistant Examiner—Arlen L. Olsen
Attorney, Agent, or Firm—Spencer & Frank

[57] ABSTRACT

An electromagnetically operable friction-disk clutch for an impeller of a fan, in particular of motor vehicle internal-combustion engines, is proposed, in which the impeller can be driven at engine speed and two different windmilling speeds. To produce the engine speed, a first electromagnetic friction-disk clutch (4) is provided, which drives the impeller (2) via an armature ring (15) and an impeller hub (17). A lower windmilling speed is generated by a second electromagnetic friction-disk clutch (6) via an eddy-current coupling (7). A special, integral stepped ball bearing (19) serves for this purpose, the intermediate ring (22) of which serves as drive flange (22) for the eddy current coupling (7).

10 Claims, 1 Drawing Sheet

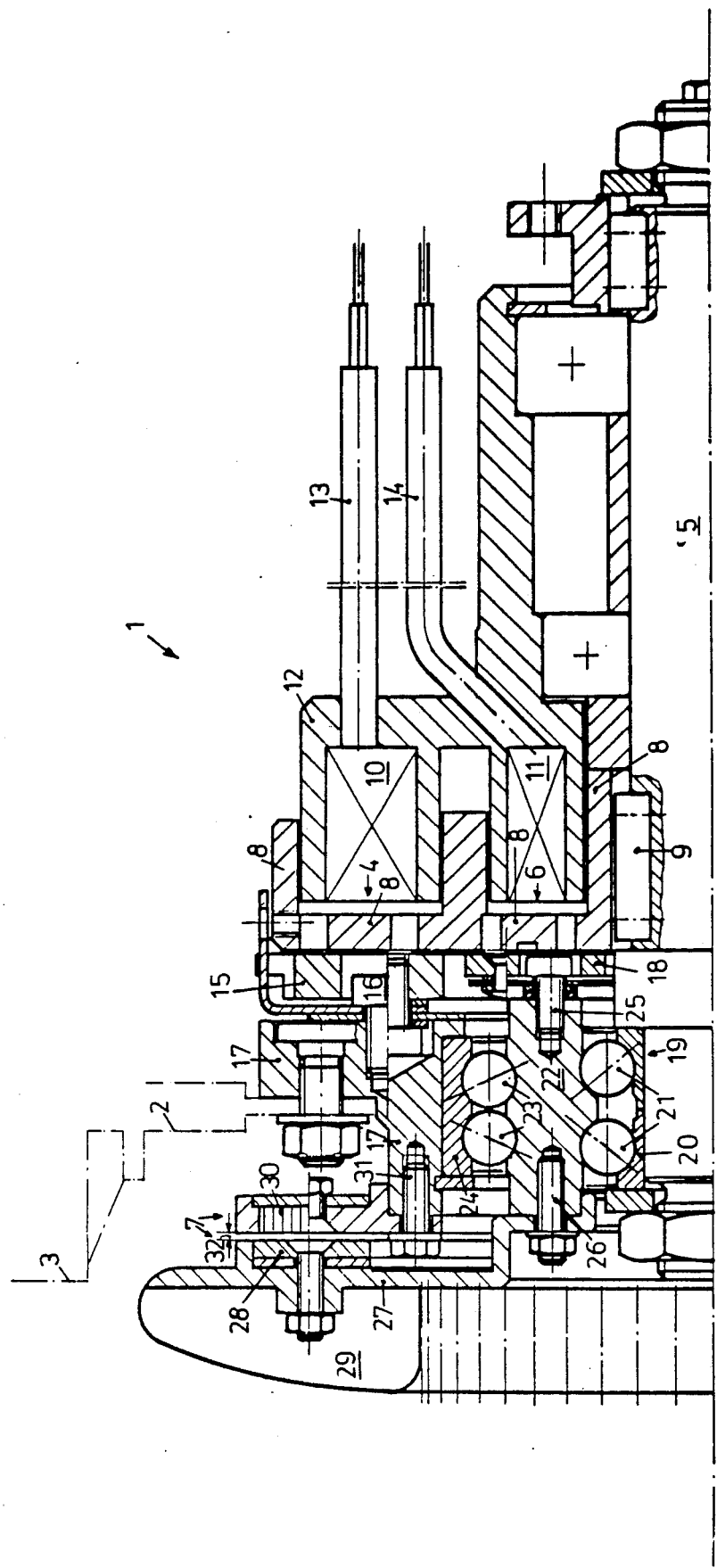

ELECTROMAGNETICALLY OPERABLE FRICTION-DISK CLUTCH

BACKGROUND OF THE INVENTION

The invention relates to an elecro-magnetically operable friction-disk clutch for the impeller of a fan, in particular of motor vehicle internal-combustion engines. The impeller is connected via a first electromagnetic frictiondisk clutch directly to the drive shaft and, at engine speed and with disengaged first friction-disk clutch, is capable of being driven via an eddy-current coupling which can be switched by means of a second friction-disk clutch, to a lower windmilling speed. With disengaged first and second friction-disk clutch, the runner wheel of the eddy-current coupling is capable of being driven via the friction of a ball bearing arranged on the drive shaft.

German patent application DE No. 32 03 143 has disclosed an electromagnetically operable friction-disk clutch for the impeller of a fan, in particular of motor vehicle internal-combustion engines, in which, with disengaged friction-disk clutch, the impeller is carried along by a second clutch device designed as an eddy-current coupling. In this case, the drive shaft is connected to an electrically conductive runner wheel and the freely rotating impeller is connected to a permanent magnet of the eddy-current coupling.

The object and aim of the known friction-disk clutch is to continue moving, at a certain minimum windmilling speed, the impeller of a fan, in particular of a motor vehicle engine, even with de-energized fan drive via an electromagnetically operable friction-disk clutch, in order to ensure the cooling of electronic components in the engine compartment. The impeller of the fan can consequently be driven via an electromagnetically operable friction-disk clutch at the speed of the drive shaft, i.e. at the engine speed, or, with disengaged electromagnetic friction-disk clutch, at a maximum windmilling speed, determined by the eddy-current coupling. In the case of the known arrangement, this windmilling speed is of the order of magnitude of about 1,100 r.p.m. It can be controlled by the number of permanent magnets and by the distance between runner and permanent magnets.

In the case of this known arrangement, sometimes the possibility has been considered to disengage, in special cases the eddy-current coupling completely from the drive shaft, which can take place via a second electromagnetically operable friction-disk clutch or via some other clutch device.

In the case of a further known device, the drive flange for the eddy-current coupling is mounted rotatably, for example by means of a ball bearing, on the engine-driven drive shaft, this drive flange being connected via a second electromagnetic friction-disk clutch to the drive shaft. The direct connection of the drive shaft to the impeller is in this case performed analogously to the abovementioned publication DE No. 32 03 143. At the same time it is necessary here for a further ball bearing to be mounted on the drive flange for the eddy-current coupling, which ball bearing bears the armature ring of the first electromagnetic friction-disk clutch and the impeller connected thereto.

With disengaged first and second friction-disk clutch, the impeller of the known clutch arrangement is driven merely via the friction of the inner ball bearing between drive flange for the eddy-current coupling and drive shaft, an idling speed of about 80 rpm establishing itself. This further development of the device according to DE 32 03 143 consequently has the advantage that the windmilling speed can be reduced still further by separation of the direct connection between the eddy-current coupling and the drive shaft. This gives three adjustable fan speeds for the impeller.

The further development described has, however, the disadvantage that at least two superjacent ball bearings or adjacent ball-bearing pairs are required, which enclose between them the drive flange for the eddy-current coupling as rotatable mounting flange. The air gap at the eddy-current coupling is, for example, of the order of magnitude of 0.8 mm. An air gap change acts directly on the torque transmission of an eddy-current coupling, so that small deviations in the air gap have considerable torque changes as a consequence.

With the use of high-quality, very strong magnets for the permanent magnet of the eddy-current coupling, air gap changes likewise play a great part. As a result of this, the use of two superjacent ball bearings, if appropriate of two superjacent ball-bearing pairs (two adjacent ball bearings in each case) requires a great degree of tolerance keeping, in particular also with regard to the drive flange in between for the eddy-current coupling. Another disadvantage of the known further development is that superjacent ball-bearing pairs also have a great space requirement which greatly increases the overall electromagnetically operable friction-disk clutch in its dimensions. Furthermore, in the case of a plurality of individual ball bearings, the possibility arises of stresses occurring due to imprecise fabrication, which leads to premature wear and an unsatisfactory clutch action.

SUMMARY OF THE INVENTION

The invention is based on the object of eliminating the disadvantages mentioned above and of providing a torque-transmitting assembly which includes a clutch (such as an electromagnetically operable friction-disk clutch) and an eddy-current coupling and which is of simplest possible design and can be produced with smaller tolerances. At the same time, in particular three different speeds of the impeller of the fan are to be adjustable. This object and others to become apparent as the specification progresses, are accomplished by the invention, according to which, briefly stated, the torque-transmitting assembly includes a drive shaft adapted to be rotated by external power; an output member mounted on the shaft; an eddy-current coupling mounted on the shaft; a ball bearing mounted on the shaft for rotation thereon and having a series of radially inner bearing balls; a series of radially outer bearing balls; an inner ring surrounded by the series of radially inner bearing balls and being seated on the shaft; an outer ring surrounding the series of radially outer bearing balls and supporting the output member; and a rotary intermediate ring extending between and being in a contacting relationship with the radially inner bearing balls and the radially outer bearing balls. The intermediate ring is affixed to the driving member of the eddy-current coupling which also has a driven member that is unitary with the output member. The torque-transmitting assembly further has a clutch mounted on the shaft and having an engaged state in which the clutch maintains a torque-transmitting connection between the shaft and the intermediate ring, whereby the shaft drives the driving member of the eddy-current coupling through the clutch and the intermediate ring. The clutch further has a disengaged state in which the torque-transmitting connection between the shaft and the intermediate ring is absent.

The electromagnetically operable friction-disk clutch according to the invention is decisively improved over the prior art. By means of the special, integral stepped ball bearing, both a bearing of the clutch parts and the drive of the runner of the eddy-current coupling are accomplished. In this arrangements, in particular the intermediate ring between inner and outer ball bearing serves additionally as drive flange between the second electromagnetic friction-disk clutch and the eddy-current coupling. The common outer ring for the inner ball bearing and inner ring for the outer ball bearing consequently has several special functions. As a result, there is no need for a separate drive flange for the eddy-current coupling, which leads to a saving in costs. Due to the one-piece or integral stepped ball bearing, there is also no need for the otherwise necessary fits, to be produced with extremely low tolerances, for a number of conventional ball bearings, which likewise vary in their tolerances. Due to the common use of the intermediate ring as the drive flange for the eddy-current coupling and as the outer and inner ring for the stepped ball bearing, considerable space and weight are saved. Furthermore, no stresses can occur, i.e. the arrangement is stress-free with regard to the bearing.

According to a further feature of the invention, the integral stepped ball bearing is made up of two superjacent, double-row angular-contact ball bearings, as a result of which the advantages of conventional double-row angular-contact ball bearings with regard to the absorption of force and torque are ensured.

According to still another feature of the invention, the intermediate ring of the stepped ball bearing forms the connection of the second electromagnetic friction-disk clutch to the eddy-current coupling and the outer ring forms the bearing of the impeller hub with permanent magnet of the eddy-current coupling. The impeller hub is connected to the armature ring of the first friction-disk clutch.

BRIEF DESCRIPTION OF THE DRAWING

The sole Figure is an axial sectional view of a longitudinal symmetrical half of a preferred embodiment of the invention.

DESCRIPTION OF THE PREFERRED EMBODIMENT

The operating principle and design of an electromagnetically operable friction-disk clutch for the drive of an impeller of a fan is described in great detail in DE 32-3 143 mentioned at the beginning, or in German Utility Model GM No. 71 09 726. By way of addition, reference is expressly made to these publications.

The electromagnetically operable friction-disk clutch assembly 1 for the drive of an impeller 2 of a fan 3 of motor vehicle internal-combustion engines consists of a first electromagnetic friction-disk clutch 4 for direct transmission of the engine speed transferred to the drive shaft 5 to the impeller 2. The impeller 2 may be regarded as the output member of the entire clutch assembly 1. A second electromagnetic friction-disk clutch 6 transmits the engine speed of the drive shaft 5 onto an eddy-current coupling 7, for the generation of a lower windmilling speed of the impeller 2.

The radially superjacent first and second friction-disk clutches 4, 6 have a common rotating rotor 8, which is connected fixedly in terms of rotation via the feather-key 9 to the drive shaft 5. The two exciter windings 10, 11 of the electromagnetic friction-disk clutches 4, 6 are surrounded by a common stationary stator 12. The power terminals are denoted by 13 and 14.

The upper, first electromagnetic friction-disk clutch 4 has an armature ring 15, which, with engaged electromagnetic friction-disk clutch 4, i.e. with energization of the exciter winding 10, is drawn towards the rotor 8 and consequently assumes the speed of the latter, determined by the drive shaft 5. The armature ring 15 is connected via a screw connection 16 to the impeller hub 17. With engaged first electromagnetic friction-disk clutch 4, the engine speed is consequently transmitted via the drive shaft 5, the rotor 8, the armature ring 15 and the impeller hub 17 directly to the impeller 2. To this extent, this corresponds to the arrangement according to DE 32 03 143.

The second electromagnetic friction-disk clutch 6 has an associated armature ring 18, which, with engaged electromagnetic friction-disk clutch 6, i.e. with power supplied to the exciter winding 11 is drawn to the rotor 8 rotating with the drive shaft 5.

According to the invention, a special integral stepped ball bearing 19 is provided, consisting of an inner ring or inner race 20, arranged on the the drive shaft 5, for a radially inner ball bearing 21, consisting of an intermediate ring or intermediate race 22, which forms the outer race for the inner ball bearing 21 and the inner race for an outer ball bearing 23. The stepped ball bearing 19 is bounded on the outside by an outer ring or outer race 24, on which the impeller hub 17 rotates.

The intermediate ring 22 of the special stepped ball bearing 19 is designed at the same time as drive flange 22 with screw connections 25, 26. The armature ring 18 of the second electromagnetic friction-disk clutch 6 is fastened via the screw connection 25 to the intermediate ring 22 of the stepped ball bearing 19. On the opposite, front side of the intermediate ring 22 there is fastened by means of the screw connection 26 a mounting flange 27, which bears the electrically conductive runner 28 of the eddy-current coupling 7. At the same time, the mounting flange 27 is designed in the front region as blade 29 for additional cooling of the eddy-current coupling 7. The permanent magnet 30 of the eddy-current coupling 7, having for example four to ten individual segments of alternating polarity, is connected via the screw connection 31 to the impeller hub 17. Between the runner 28 and the permanent magnet 30 of the eddy-current coupling 7, the air gap 32, which is to be maintained as accurately as possible, has to be maintained for transmission of a torque for a windmilling speed of the impeller 2. The mounting flange 27 and the runner 28 attached thereto may be regarded as the driving member, and the impeller hub 17 with the permanent magnet 30 attached thereto may be regarded as the driven member of the eddy-current coupling 7.

The friction-disk clutch according to the invention operates as follows: With disengaged first and second electromagnetic friction-disk, clutches 4 and 6, respectively, the rotor 8 runs at the engine speed due to the rigid connection 9 with the drive shaft 5, without the armature rings 15, 18 of the two friction-disk clutches 4, 6 being taken along. Likewise, the inner ring 20, mounted on the drive shaft 5, of the stepped ball bearing 19 runs at engine speed and effects via the friction of the inner ball bearing 21 a carrying along of the intermediate ring 22, which serves as drive flange 22 for the runner 28 of the eddy-current coupling 7. The friction of the inner ball bearing consequently effects a carrying along of the runner 28 and thus of the permanent magnet 30 and of the impeller 2 connected thereto. This speed is, for example, about 80 to 100 rpm. This low speed is often sufficient to generate a certain minimum degree of cooling for the electronic components.

If this cooling is not sufficient, the armature ring 18 can be drawn to the rotor 8 rotating at engine speed via the second electromagnetic friction-disk clutch (6), by power supplied to the exciter winding 11, as a result of which the intermediate ring 22 connected to the armature ring 18 likewise rotates at engine speed as drive flange and passes on the said engine speed via the mounting flange 27 to the runner 28 of the eddy-current coupling 7. The runner 28 consequently likewise rotates at the engine speed of the drive shaft 5.

The eddy-current coupling 7 is designed in a known way such that it merely generates a windmilling speed for the impeller 2, which is of the order of magnitude of about 1100 rpm at most. In this case, it is important that a gentle, and consequently not noticeable or jerky, acceleration of the impeller 2 takes effect. The advantages of this handling are described in DE 32 03 143.

The third adjustment possibility of the frictiondisk clutch 11 according to the invention is that the engine speed of the drive shaft 5 is transmitted via the first electromagnetic friction-disk clutch 4, to be engaged, directly to the impeller 2. For this purpose the exciter winding 10 is energized, as a result of which the armature ring 15 is drawn towards the rotating runner 8 and consequently the impeller hub 17 and the impeller 2 are brought to engine speed.

The design according to the invention of the stepped ball bearing 19 with an intermediate ring 22, designed as drive flange, for the drive of the eddy-current coupling 7 makes possible an extremely compact design of the friction-disk clutch 1. In this arrangement, the radially inner ball bearing 21 and the radially outer ball bearing 23 are designed as double-row angular contact ball bearing, in order to absorb both axial and radial forces. The intermediate ring 22 of the stepped ball bearing 19, formed from one unit, serves at the same time as drive flange 22 for the eddy-current coupling 7. Production tolerances need now only be taken into account in the region of the drive shaft 5 and of the impeller hub 17, achieving a considerable simplification in fabrication, in particular also due to the dispensing with an additional intermediate flange which has the function of the drive flange 22.

The use of an integral, adapted stepped ballbearing consequently brings about considerable savings in costs and weight, guarantees a simple installation and removal of the individual parts and simplifies significantly the friction-disk clutch according to the invention.

The invention is not restricted to the exemplary embodiment shown and described. Rather, it also comprises all modifications of the fundamental idea underlying the invention without inventive content of their own.

I claim:

1. A torque-transmitting assembly comprising
   (a) a drive shaft adapted to be rotated by external power;
   (b) an output member mounted on the shaft for rotation thereon;
   (c) an eddy-current coupling mounted on said shaft for rotation thereon and including
     (1) a rotatable driving member;
     (2) a rotatable driven member being unitary with said output member; and
     (3) magnetic force-transmitting means for applying a driving torque from the driving member to the driven member upon rotation of the driving member;
   (d) a ball bearing mounted on said shaft for rotation thereon and including
     (1) a series of radially inner bearing balls;
     (2) a series of radially outer bearing balls;
     (3) an inner ring surrounded by said series of radially inner bearing balls and being seated on said shaft;
     (4) an outer ring surrounding said series of radially outer bearing balls and supporting said output member; and
     (5) a rotary intermediate ring extending between and being in a contacting relationship with the radially inner bearing balls and the radially outer bearing balls; the intermediate ring being affixed to said rotatable driving member of the eddy-current coupling; and
   (3) a clutch mounted on said shaft and having an engaged state in which said clutch maintains a torquetransmitting connection between said shaft and said intermediate ring, whereby said shaft drives the rotatable driving member of said eddy-current coupling through said clutch and said intermediate ring; said clutch further having a disengaged state in which said torque-transmitting connection between said shaft and said intermediate ring is absent.

2. A torque-transmitting assembly as defined in claim 1, wherein said clutch comprises
   (a) a first clutch component torque-transmittingly mounted on said shaft for rotation with said shaft as a unit;
   (b) a second clutch component secured to said intermediate ring and cooperating with said first clutch component and being affixed to said intermediate ring; and
   (c) actuating means for torque-transmittingly connecting said first and second clutch components with one another to establish said engaged state and for disconnecting the clutch components from one another to establish said disengaged state.

3. A torque-transmitting assembly as defined in claim 2, wherein said clutch is an electromagnetically operable clutch and further wherein said actuating means comprises an energizable solenoid, said first clutch component is a rotor situated adjacent said solenoid and said second clutch component is an armature ring attractable to said rotor by said solenoid.

4. A torque-transmitting assembly as defined in claim 1, further comprising a fan impeller mounted on said output member for rotation therewith as a unit.

5. A torque-transmitting assembly as defined in claim 1, further comprising an additional clutch mounted on said shaft and having an engaged state in which said additional clutch maintains a torque-transmitting connection between said shaft and said output member, whereby said shaft directly drives said output member through said clutch; said additional clutch further having a disengaged state in which said torque-transmitting connection between said shaft and said output member is absent.

6. An electromagnetically operable torque-transmitting assembly comprising
 (a) a drive shaft adapted to be rotated by external power;
 (b) a fan impeller unit, forming an output member of said assembly, mounted on said shaft for rotation thereon;
 (c) an eddy-current coupling mounted on said shaft for rotation thereon and including
  (1) a rotatable driving member;
  (2) a rotatable driven member unitary with said fan impeller unit; and
  (3) magnetic force-transmitting means for applying a driving torque from the driving member to the driven member upon rotation of the driving member;
 (d) a ball bearing mounted on said shaft for rotation thereon and including
  (1) a series of radially inner bearing balls;
  (2) a series of radially outer bearing balls;
  (3) an inner ring surrounded by said series of radially inner bearing balls and being seated on said shaft;
  (4) an outer ring surrounding said series of radially outer bearing balls and supporting said fan impeller unit; and
  (5) a rotary intermediate ring extending between and being in a contacting relationship with the radially inner bearing balls and the radially outer bearing balls; the intermediate ring being affixed to said rotatable driving member of the eddy-current coupling;
 (e) a first electromagnetically operable clutch mounted on said shaft and having an engaged state in which said first clutch maintains a torque-transmitting connection between said shaft and said fan impeller unit, whereby said shaft directly drives said fan impeller unit through said first clutch; said first clutch further having a disengaged state in which said torque-transmitting connection between said shaft and said fan impeller unit is absent; and
 (f) a second electromagnetically operable clutch mounted on said shaft and having an engaged state in which said clutch maintains a torque-transmitting connection between said shaft and said intermediate ring, whereby said shaft drives the rotatable driving member of said eddy-current coupling through said second electromagnetically operable clutch and said intermediate ring; said second electromagnetically operable clutch further having a disengaged state in which said torque-transmitting connection between said shaft and said intermediate ring is absent.

7. An electromagnetically operable torque-transmitting assembly as defined in claim 6, wherein said ball bearing is a stepped ball bearing; said series of inner and outer bearing balls each being divided into two axially adjacent subseries of angular-contact bearing balls.

8. An electromagnetically operable torque-transmitting assembly as defined in claim 6, wherein said second electromagnetically operable clutch includes an armature ring affixed to said intermediate ring of said bearing.

9. An electromagnetically operable torque-transmitting assembly as defined in claim 8, wherein said magnetic force-transmitting means of said eddy-current coupling comprises a permanent magnet mounted on said fan impeller unit.

10. An electromagnetically operable torque-transmitting assembly as defined in claim 6, wherein said first electromagnetically operable clutch includes an armature ring affixed to said fan impeller unit.

* * * * *